(12) United States Patent
Samuel

(10) Patent No.: US 8,714,288 B2
(45) Date of Patent: May 6, 2014

(54) HYBRID VARIANT AUTOMOBILE DRIVE

(75) Inventor: Woodson Wayne Samuel, Long Beach, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 126 days.

(21) Appl. No.: 13/030,083

(22) Filed: Feb. 17, 2011

(65) Prior Publication Data

US 2012/0211286 A1    Aug. 23, 2012

(51) Int. Cl.
B60W 10/06      (2006.01)
B60K 16/00      (2006.01)

(52) U.S. Cl.
USPC .... 180/65.28; 180/65.21; 180/2.2; 180/65.31

(58) Field of Classification Search
USPC ............... 180/2.1, 65.31, 65.26, 65.1, 65.21, 180/65.27, 65.28, 65.29
See application file for complete search history.

(56) References Cited

U.S. PATENT DOCUMENTS

| | | |
|---|---|---|
| 3,350,876 A | 11/1967 | Johnson |
| 3,830,062 A | 8/1974 | Morgan et al. |
| 3,979,913 A | 9/1976 | Yates |
| 4,031,705 A | 6/1977 | Berg |
| 4,201,058 A | 5/1980 | Vaughan |
| 4,276,747 A | 7/1981 | Faldella et al. |
| 4,300,353 A | 11/1981 | Ridgway |
| 4,393,656 A | 7/1983 | Anderson et al. |
| 4,405,029 A | 9/1983 | Hunt |
| 4,470,476 A | 9/1984 | Hunt |
| 4,537,032 A | 8/1985 | Kaplan |
| 4,586,338 A | 5/1986 | Barrett et al. |
| 4,592,436 A | 6/1986 | Tomei |
| 4,996,845 A | 3/1991 | Kim |
| 5,000,003 A | 3/1991 | Wicks |
| 5,008,062 A | 4/1991 | Anderson et al. |
| 5,176,000 A | 1/1993 | Dauksis |
| 5,191,766 A | 3/1993 | Vines |
| 5,228,925 A | 7/1993 | Nath et al. |
| 5,327,987 A | 7/1994 | Abdelmalek |
| 5,385,211 A | 1/1995 | Carroll |
| 5,398,747 A | 3/1995 | Miaoulis |
| 5,708,306 A | 1/1998 | Lin |
| 5,800,631 A | 9/1998 | Yamada et al. |

(Continued)

FOREIGN PATENT DOCUMENTS

| | | |
|---|---|---|
| JP | 2006299858 | 11/2006 |
| JP | 2006322407 | 11/2006 |
| WO | WO 2007032801 | 3/2007 |

*Primary Examiner* — Hau Phan
*Assistant Examiner* — Bryan Evans
(74) *Attorney, Agent, or Firm* — Snell & Wilmer LLP

(57) ABSTRACT

The present invention relates to a hybrid variant automobile drive which improves a fuel efficiency of the automobile while retaining an acceleration profile of the automobile. In one embodiment, the present invention includes an engine, wheels, and/or a supplemental motor. The engine primarily drives the wheels, but can be aided by the supplemental motor. An amount of force supplied by the engine can be dependent on an amount of force supplied by the supplemental motor. The supplemental motor uses alternative energy sources aside from the fuel used by the engine to drive the wheels. The supplemental motor can be powered by a capacitor which is charged by an energy generation unit. The energy generation unit can generate energy using, for example, solar panels, a ram induction generator, a regenerative braking unit, and/or a heat exchange unit.

17 Claims, 4 Drawing Sheets

(56) References Cited

U.S. PATENT DOCUMENTS

| | | |
|---|---|---|
| 5,806,332 A | 9/1998 | Shea, Sr. |
| 5,842,534 A * | 12/1998 | Frank .................. 180/65.25 |
| 6,041,595 A | 3/2000 | Halimi et al. |
| 6,202,782 B1 | 3/2001 | Hatanaka |
| 6,369,316 B1 | 4/2002 | Plessing et al. |
| 6,423,894 B1 | 7/2002 | Patz et al. |
| 6,450,283 B1 | 9/2002 | Taggett |
| 6,536,828 B2 | 3/2003 | Love et al. |
| 6,571,552 B2 | 6/2003 | Ban et al. |
| 6,586,668 B2 | 7/2003 | Shugar et al. |
| 6,729,137 B2 | 5/2004 | Filippone |
| 6,739,389 B2 | 5/2004 | Nakagawa et al. |
| 6,755,266 B2 * | 6/2004 | Lasson ................ 180/65.235 |
| 6,862,511 B1 * | 3/2005 | Phillips et al. ............. 701/54 |
| 6,904,766 B2 | 6/2005 | Ito et al. |
| 6,910,333 B2 | 6/2005 | Minemi et al. |
| 6,913,068 B2 | 7/2005 | Togawa et al. |
| 7,056,251 B2 | 6/2006 | Ibaraki |
| 7,059,132 B2 | 6/2006 | Odani et al. |
| 7,104,063 B2 | 9/2006 | Clemens |
| 7,181,912 B2 | 2/2007 | Mori |
| 7,181,919 B2 | 2/2007 | Uno et al. |
| 7,227,274 B2 * | 6/2007 | Berkson .................. 290/40 R |
| 7,246,487 B2 | 7/2007 | Hara |
| 7,253,353 B2 | 8/2007 | Stabler |
| 7,309,831 B2 | 12/2007 | Yamada et al. |
| 7,430,865 B2 | 10/2008 | Filippone |
| 7,520,133 B2 | 4/2009 | Hoetger et al. |
| 7,549,412 B2 | 6/2009 | Singh |
| 7,597,388 B1 | 10/2009 | Samuel |
| 7,608,777 B2 | 10/2009 | Bell et al. |
| 2005/0012021 A1 | 1/2005 | Middelman et al. |
| 2005/0046195 A1 | 3/2005 | Kousoulis |
| 2005/0133082 A1 | 6/2005 | Konold et al. |
| 2005/0257967 A1 * | 11/2005 | Vahabzadeh et al. ........ 180/65.2 |
| 2005/0262842 A1 | 12/2005 | Claassen et al. |
| 2006/0032226 A1 | 2/2006 | Filippone |
| 2006/0118157 A1 | 6/2006 | Johnson et al. |
| 2006/0207644 A1 | 9/2006 | Robinson et al. |
| 2006/0231235 A1 | 10/2006 | Yamanaka et al. |
| 2007/0028587 A1 | 2/2007 | Steers |
| 2007/0084496 A1 | 4/2007 | Edey |
| 2007/0101716 A1 | 5/2007 | Tafas |
| 2007/0137851 A1 | 6/2007 | Hamada et al. |
| 2007/0227144 A1 | 10/2007 | Yaguchi et al. |
| 2007/0227472 A1 | 10/2007 | Takeuchi et al. |
| 2007/0235164 A1 | 10/2007 | Miyagawa et al. |
| 2007/0245737 A1 | 10/2007 | Inaba et al. |
| 2007/0261896 A1 | 11/2007 | Shaffer et al. |
| 2007/0284087 A1 | 12/2007 | Kohara et al. |
| 2007/0289721 A1 | 12/2007 | Miyagawa et al. |
| 2008/0022681 A1 | 1/2008 | Tafas |
| 2008/0022682 A1 | 1/2008 | Tafas |
| 2008/0034728 A1 | 2/2008 | Tafas |
| 2008/0034729 A1 | 2/2008 | Tafas |
| 2008/0041046 A1 | 2/2008 | Bering |
| 2008/0072583 A1 | 3/2008 | Sakita |
| 2008/0115923 A1 | 5/2008 | Yamanaka et al. |
| 2008/0211230 A1 | 9/2008 | Gurin |
| 2008/0216480 A1 | 9/2008 | Harmon et al. |
| 2008/0223632 A1 | 9/2008 | Bartilson |
| 2008/0236653 A1 | 10/2008 | Kelly |
| 2010/0000808 A1 * | 1/2010 | Delisle et al. .............. 180/65.26 |
| 2010/0031682 A1 | 2/2010 | Gaerlan |
| 2010/0077741 A1 * | 4/2010 | Samuel ..................... 60/320 |

* cited by examiner

HYBRID VARIANT AUTOMOBILE DRIVE

BACKGROUND

1. Field

The present invention relates to a hybrid variant automobile drive which improves the fuel efficiency of an automobile while retaining an acceleration profile of the automobile.

2. Description of the Related Art

A conventional automobile can use an internal combustion engine to drive the wheels on the conventional automobile. The internal combustion engine can consume and combust, for example, fuel such as gasoline to generate the force required to power the wheels. While the combustion of fuel generates a lot of force, it also has some unintended side effects. For example, the combustion of fuel can generate emissions which are environmentally detrimental. With growing restrictions on emissions by the government or regulatory agencies, this can pose problems when using the conventional automobile with the internal combustion engine.

Furthermore, the production of fuel such as gasoline tends to be limited to a select amount of countries. Some of these countries lie in unstable regions and dependence on gasoline can lead to undesirable results both politically and economically.

A conventional hybrid automobile was developed in response to such problems with the conventional automobile. However, the conventional hybrid automobile usually switched between using a motor and using an internal combustion engine. This was also unsatisfactory in some respects because of the limited acceleration available when using the motor. Thus, the acceleration profile of the conventional hybrid automobile can be limited when compared to the conventional automobile.

Thus, there is a need for a hybrid variant automobile drive which improves the fuel efficiency of the automobile while retaining an acceleration profile of the automobile.

SUMMARY

The present invention relates to a hybrid variant automobile drive which improves the fuel efficiency of the automobile while retaining an acceleration profile of the automobile. In one embodiment, the present invention includes an engine, wheels, and/or a supplemental motor. The engine primarily drives the wheels, but can be aided by the supplemental motor. The supplemental motor uses alternative energy sources aside from the fuel used by the engine to drive the wheels. For example, the supplemental motor can be powered by a capacitor which is charged by an energy generation unit. The energy generation unit can generate energy using, for example, solar panels, a ram induction generator, a regenerative braking unit, and/or a heat exchange unit. Thus, the energy generation unit can generate energy from what is ordinarily wasted energy such as the sun shining on the automobile, wind passing by the automobile, the force of braking the automobile, and/or even the high temperatures in the exhaust.

Thus, the supplemental motor can aid in driving the wheels, and can reduce the amount of force the engine has to deliver to drive the wheels. The amount of force supplied by the engine can depend on and correspond to the amount of force supplied by the supplemental motor. This can reduce a fuel consumption of the engine and improve the overall fuel efficiency of the automobile. Furthermore, the acceleration profile of the automobile is maintained as if only an engine was being used because the supplemental motor only supplements the force supplied by the engine.

Furthermore, the capacitor is lighter than a conventional hybrid battery. Thus, the use of the capacitor instead of the conventional hybrid battery reduces a weight of the automobile. This can increase an overall fuel efficiency of the automobile. In addition, a capacitor tends to have a longer charge life longer than a battery, so the use of the capacitor may also decrease a frequency with which the capacitor has to be replaced, and reduce a maintenance cost of the automobile.

In one embodiment, the present invention is an automobile including a plurality of wheels, an engine configured to drive the plurality of wheels, a supplemental motor configured to drive the plurality of wheels, and a capacitor configured to power the supplemental motor.

In another embodiment, the present invention is an automobile including a plurality of wheels, an engine configured to drive the plurality of wheels, a supplemental motor configured to drive the plurality of wheels, and operate while the engine is operating, wherein an amount of force supplied by the engine to drive the plurality of wheels is based on an amount of force supplied by the supplemental motor to drive the plurality of wheels, a capacitor configured to power the supplemental motor, and an energy generation unit configured to charge the capacitor.

In yet another embodiment, the present invention is a method for driving a plurality of wheels in an automobile including driving a plurality of wheels using an engine, driving the plurality of wheels using a supplemental motor, wherein an amount of force supplied by the engine to drive the plurality of wheels is based on an amount of force supplied by the supplemental motor to drive the plurality of wheels, and powering the supplemental motor using a capacitor.

BRIEF DESCRIPTION OF THE DRAWINGS

The features, obstacles, and advantages of the present invention will become more apparent from the detailed description set forth below when taken in conjunction with the drawings, wherein.

DETAILED DESCRIPTION

Apparatus, systems and methods that implement the embodiments of the various features of the present invention will now be described with reference to the drawings. The drawings and the associated descriptions are provided to illustrate some embodiments of the present invention and not to limit the scope of the present invention. Throughout the drawings, reference numbers are re-used to indicate correspondence between referenced elements.

Figure 1:
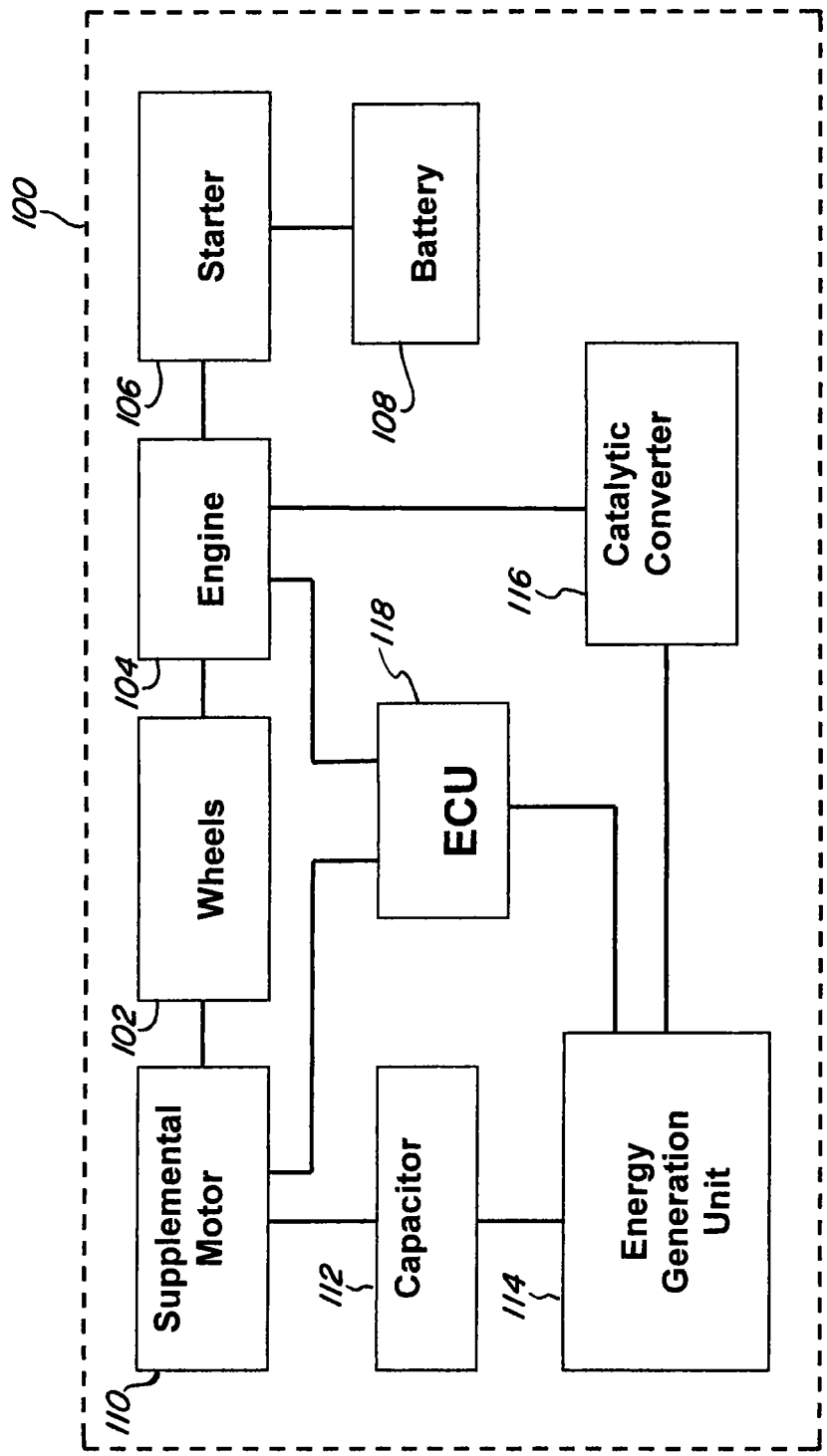
FIG. 1 is a box diagram of an automobile including an engine and a supplemental motor according to an embodiment of the present invention.

In one embodiment, the present invention includes an automobile 100 as shown in FIG. 1. The automobile 100 can include, for example, wheels 102, an engine 104, a starter 106, a battery 108, a supplemental motor 110, a capacitor 112, an energy generation unit 114, a catalytic converter 116, and/or an engine control unit 118.

The engine 104 primarily drives the wheels 102. The engine 104 can be, for example, an internal combustion engine. The internal combustion engine can combust fuel, such as gasoline, ethanol, diesel, biofuel, or other types of fuels which are suitable to move the automobile 100. The engine 104 is activated by the starter 106, which is powered by the battery 108. An output of the engine 104 is received by the catalytic converter 116. In driving the wheels 102, the engine 104 is aided by the supplemental motor 110. Thus, an amount of force supplied by the engine 104 to drive the wheels is supplemented by the force from the supplemental motor 110.

In one embodiment, the amount of force that is supplied by the engine 104 can be dependent on the amount of force that is supplied by the supplement motor 110. Thus, the more force that is supplied by the supplemental motor 110, the less force that is supplied by the engine 104. Since an increase in force supplied by the supplemental motor 110 decreases an amount of force supplied by the engine 104, the increase in force supplied by the supplemental motor 110 will also decrease an amount of fuel consumed by the engine 104. This can reduce emissions of the engine 104 and also improve the fuel efficiency of the automobile 100 as a whole. The amount of force supplied by the supplemental motor 110 can be controlled by the engine control unit 118, which will be described later.

The supplemental motor 110 supplies force to the wheels 102 using energy generated from alternative energy sources aside from the fuel which is used to power the engine 104. The supplemental motor 110 can be configured to operate while the engine 104 is operating. In one embodiment, the supplemental motor 110 and the engine 104 can be operating substantially simultaneously. In another embodiment, the supplemental motor 110 can only operate while the capacitor 112 has a sufficient charge to power the supplemental motor 110.

In yet another embodiment, the engine 104 drives a first set of wheels 102, while the supplemental motor 110 drives a second set of wheels 102. The first set of wheels 102 need not be identical to the second set of wheels 102, and in some instances they can be different. For example, the engine 104 and the supplemental motor 110 can both drive the front wheels of the automobile 100. However, the engine 104 can also drive the front wheels of the automobile 100 while the supplemental motor 110 can drive the back wheels of the automobile 100. Furthermore, the engine 104 could also drive all four wheels of the automobile 100 while the supplemental motor 110 only drives the front wheels of the automobile 100.

Since the supplemental motor 110 only supplements the force supplied by the engine 104, the acceleration profile of the automobile 100 is substantially retained as if only the engine 104 is being used. That is, the supplemental motor 110 does not drive the wheels 102 by itself. Since the engine 104 does most of the work, and the supplemental motor 110 only supplements the efforts of the engine 104, the acceleration profile of the automobile 100 can be retained. Furthermore, the use of the supplemental motor 110 reduces a fuel consumption of the engine 104, thereby improving an overall fuel efficiency of the automobile 100.

The alternative energy source can be, for example, energy which would ordinarily be wasted or unused, such as sun light, air flowing onto the automobile 100, regenerative braking, and/or heat from the output of the engine 104. For example, an amount of force supplied by the supplemental motor 110 is based on a charge of the capacitor 112.

The capacitor 112 can include, for example, a single capacitor, or a bank of capacitors. The capacitor 112 can also be, for example, an ultracapacitor. The charge of the capacitor 112 is based on the energy supplied by the energy generation unit 114. The capacitor 112 is advantageous over a conventional hybrid automobile battery because it is lighter than the conventional hybrid automobile battery. This again reduces an amount of fuel consumed by the automobile 100 since the automobile 100 with the capacitor 112 can weigh less than a conventional hybrid automobile including the conventional hybrid battery. This is because the supplemental motor 110 does not need a large amount of charge to drive the wheels 102 by itself, but instead only supplements the driving of the wheels 102 by the engine 104. Thus, the capacitor 112 does not need to store as much energy when compared with the conventional hybrid automobile battery. Therefore, the capacitor 112, which is lighter than the conventional hybrid battery, can be used instead of the conventional hybrid battery.

Furthermore, the capacitor 112 may have a lower charge capacity degradation than a conventional hybrid automobile battery and therefore may be more reliable. This can reduce maintenance cost of the automobile 100. In addition, the capacitor 112 can be charged faster than the conventional hybrid automobile battery.

Figure 2:
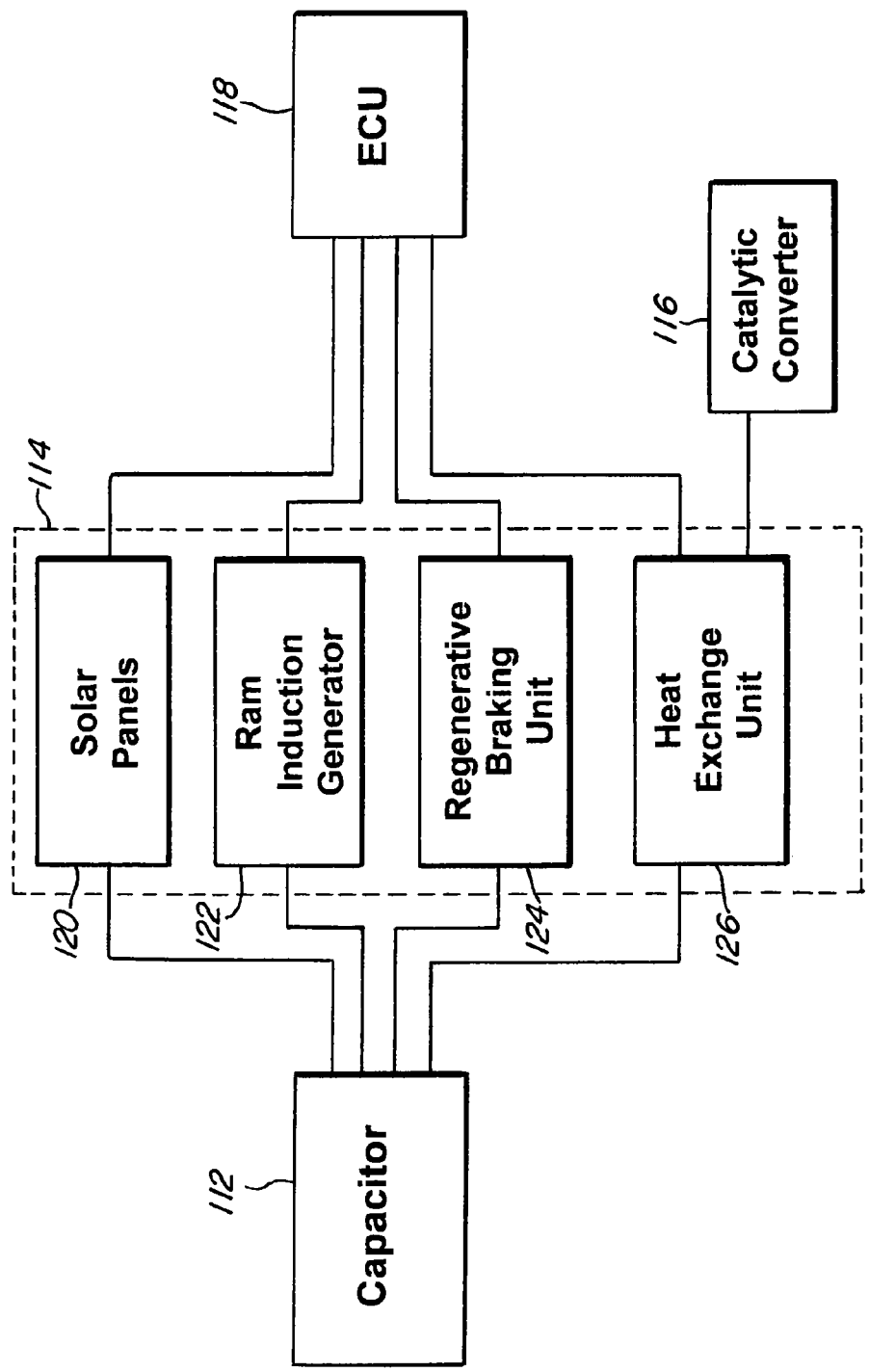
FIG. 2 is a box diagram of an energy generation unit connected to a capacitor and an engine control unit according to an embodiment of the present invention.

The energy generation unit 114 generates energy from alternative energy sources aside from fuel which is used to power the engine 104. In one embodiment, the energy generation unit 114 is seen, for example, in FIG. 2. As can be seen in FIG. 2, the energy generation unit 114 can include, for example, solar panels 120, a ram induction generator 122, a regenerative braking unit 124, and/or a heat exchange unit 126. The solar panels 120, the ram induction generator 122, the regenerative braking unit 124, and/or the heat exchange unit 126 can supply energy to the capacitor 112.

Furthermore, the operations of the solar panels 120, the ram induction generator 122, the regenerative braking unit 124, and/or the heat exchange unit 126 can be controlled and/or monitored by the engine control unit 118. The engine control unit 118 can include, for example, a plurality of sensors to monitor the operation of the solar panels 120, the ram induction generator 122, the regenerative braking unit 124, and/or the heat exchange unit 126. In addition, although the solar panels 120, the ram induction generator 122, the regenerative braking unit 124, and/or the heat exchange unit 126 are depicted in FIG. 2, other units which generate energy from alternative energy sources can also be used, so long as they are suitable to charge the capacitor 112.

The solar panels 120 can be located anywhere in the automobile 100 such that the solar panels 120 can receive light, for example, from a sun. The solar panels 120 can generate energy from the light, which can be used to charge the capacitor 112. The solar panels 120 can be, for example, photovoltaic solar panels. The solar panels 120 can be formed, for example, from monocrystalline panels, polycrystalline panels, amorphous panels, thin film panels, spray-on solar panels, spherical solar cell panels such as Sphelar® solar panels produced by Kyosemi Corporation, dye-sensitized solar cell panels, carbon nanotube solar panels, or any other types of solar panels which are suitable for the automobile 100. In one embodiment, the solar panels 120 can be, for example, solar panels described in U.S. Pat. No. 7,597,388, entitled "ELECTRIC CHARGING ROOF ON AN AUTOMOBILE," which is hereby incorporated by reference in its entirety.

The ram induction generator 122 is located anywhere in the automobile 100 such that it can receive a flow of air as the automobile 100 is moving. The ram induction generator 122 can use the flow of air to generate energy, which can be used to charge the capacitor 112. In one embodiment, the ram induction generator 122 can be, for example, a ram air generator.

The regenerative braking unit 124 can be located adjacent or near braking units of the automobile 100, or be part of the braking units of the automobile 100. When the automobile 100 brakes, energy can be generated by the regenerative braking unit 124. The regenerative braking unit 124 can use the energy generated from the braking of the automobile 100 to charge the capacitor 112. The regenerative braking unit 124 can be used, for example, on some or all of the wheels 102.

The heat exchange unit 126 can be located adjacent to the catalytic converter 116 and/or be connected to the catalytic converter 116. The heat exchange unit 126 can receive an output of the catalytic converter 116 to generate energy. This allows for an efficient recovery of energy from the output of the engine 104 after it has undergone a catalytic process. The energy generated by the heat exchange unit 126 from the heat from the catalytic converter 116 can be used to charge the capacitor 112.

Figure 3:
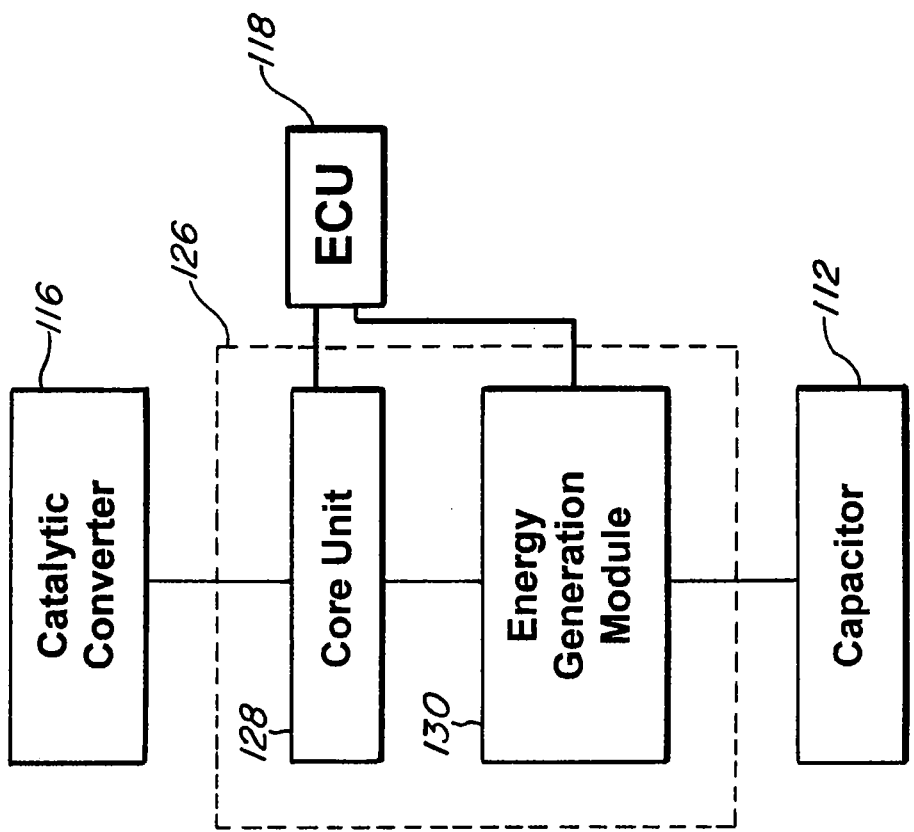
FIG. 3 is a box diagram of a heat exchange unit connected to a catalytic converter, an engine control unit, and a capacitor according to an embodiment of the present invention.

As seen in FIG. 3, the heat exchange unit 126 can include, for example, a core unit 128 and an energy generation module 130. The core unit 128 can receive the output of the catalytic converter 116 and the energy generation module 130 can generate energy from the output of the energy generation module 130. The engine control unit 118 can be connected, for example, to the core unit 128 and/or the energy generation module 130. The engine control unit 118 can monitor and/or control the operations of the core unit 128 and/or the energy generation module 130.

The energy generated by the energy generation module 130 can be used to charge the capacitor 112. In one embodiment, the heat exchange unit 126 can be, for example, a heat exchange unit described in U.S. Pat. Pub. No. 2010/0077741 entitled "WASTE HEAT AUXILIARY POWER UNIT," which is hereby incorporated by reference in its entirety.

Referring back to FIG. 1, the engine control unit 118 can monitor an operation of the supplemental motor 110, a charge level of the capacitor 112, and/or an output of the energy generation unit 114 to determine the operation of the engine 104. Likewise, the engine control unit 118 can monitor a charge level of the capacitor 112, and/or an output of the energy generation unit 114 to determine the operation of the supplemental motor 110.

For example, if there is a high charge level in the capacitor 112, and/or the energy generation unit 114 is generating a lot of energy, then there is likely enough energy for the supplemental motor 110 to be operating at a high capacity to generate a lot of force to drive the wheels 102. Thus, the engine control unit 118 can control the engine 104 to reduce the amount of force it supplies to the wheels 102, and the supplemental motor 110 to increase the amount force it supplies to the wheels 102. Reducing the amount of force supplied by the engine 104 will also reduce the amount of fuel the engine 104 consumes.

However, if there is a low charge level in the capacitor 112, and/or the energy generation unit 114 is generating a very little amount of energy, then it is likely that the supplemental motor 110 will only be able to operate at a low capacity, if at all. Thus, the engine control unit 118 can control the supplemental motor 110 to supply little or no force to drive the wheels 102. Therefore, the engine control unit 118 can also control the engine 104 to increase the amount of force it supplies to the wheels 102. This, of course, also increases an amount of fuel consumed by the engine 104.

Since a conventional automobile would only drive the wheels using an engine, any reduction in fuel consumed by the engine 104 will represent increased energy efficiency by the automobile 100 over the conventional automobile. In one embodiment, the supplemental motor 110 can provide additional force when the automobile 100 moves from a stopped position, when the automobile 100 is passing another automobile 100, and/or when propelling the automobile 100 during normal operation and thereby improving the energy efficiency of the automobile 100.

In addition, should the capacitor 112 have excess charge which is more than is required to move the automobile 100 or which is usable by the supplemental motor 110, the capacitor 112 can also be used to power other electronic devices in the automobile 100 using an inverter or other suitable means for power conversion. Such electronic devices can include, for example, electric water pumps, air conditioning coprocessors, radio systems, sound systems, and/or other devices which require power to operate in the automobile 100.

Figure 4:
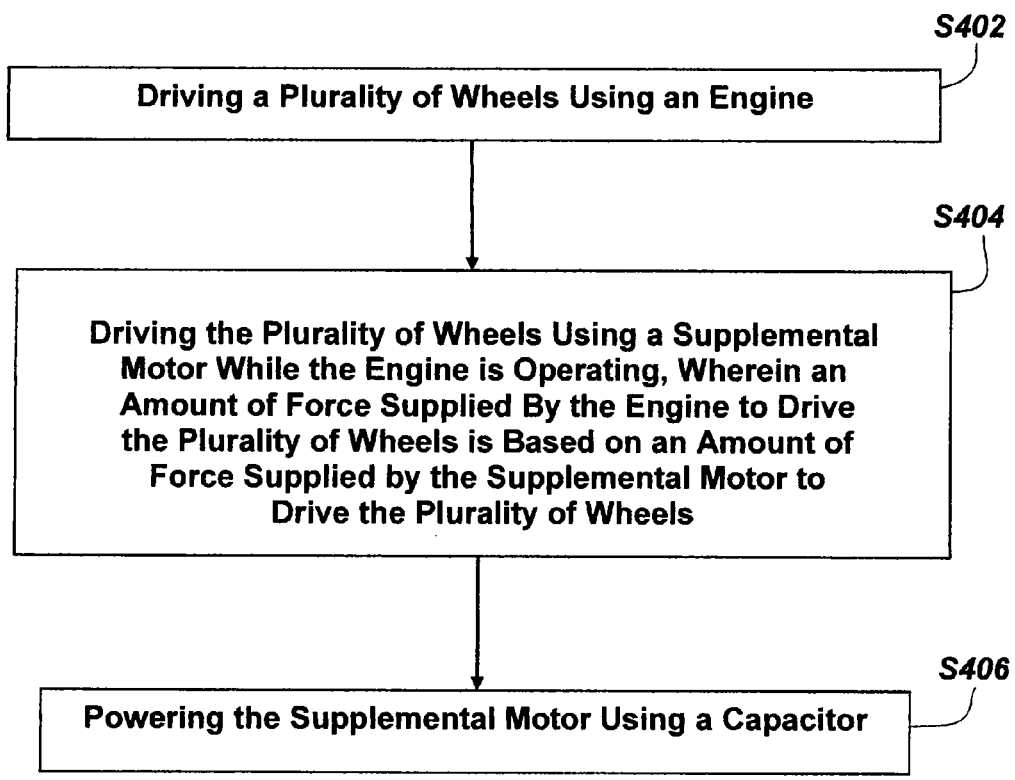
FIG. 4 is a process of driving a plurality of wheels in an automobile according to an embodiment of the present invention.

In another embodiment, the present invention is a process of driving a plurality of wheels in an automobile as shown in FIG. 4. In Step S402, a plurality of wheels are driven by an engine. For example, the wheels 102 can be driven by the engine 104. In Step S404, the plurality of wheels are driven using a supplemental motor while the engine is operating, where an amount of force supplied by the engine to drive the plurality of wheels is based on an amount of force supplied by the supplemental motor to drive the plurality of wheels. For example, the supplemental motor 110 can also drive the wheels 102 while the engine 104 is operating. The amount of force supplied by the engine 104 to drive the wheels 102 can be based on an amount of force supplied by the supplemental motor 110 to drive the wheels 102. In Step S406, the supplemental motor is powered by a capacitor. For example, the supplemental motor 110 can be powered by the capacitor 112.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. An automobile comprising:
a plurality of wheels having a first set and a second set;
an electric motor coupled to the second set of the plurality of wheels and configured to apply a mechanical force or torque to the second set of the plurality of wheels to drive the second set of plurality of the wheels;
an engine configured to apply a mechanical force or torque to the first set of the plurality of wheels to drive the first set of plurality of wheels based on an amount of the mechanical force or torque applied by the electric motor;
an engine control unit coupled to the engine and the electric motor and configured to:
increase the amount of the mechanical force or torque applied by the engine when an amount of the mechanical force or torque applied by the electric motor decreases at any acceleration value of an acceleration profile of the automobile that is based on a driver's acceleration demand such that the amount of the mechanical force or torque applied by the electric motor is insufficient without the increased amount of the mechanical force or torque applied by the engine to maintain the acceleration profile of the automobile, and
decrease the amount of the mechanical force or torque applied by the engine when the amount of the mechanical force or torque applied by the electric motor increases at any acceleration value of the acceleration profile of the automobile to maintain the acceleration profile of the automobile;
a capacitor configured to power the electric motor; and
an energy generation unit configured to charge the capacitor.

2. The automobile of claim 1 wherein the plurality of wheels includes a plurality of front wheels and a plurality of rear wheels, and the first set of the plurality of wheels includes all wheels of the plurality of wheels or only the plurality of front wheels.

3. The automobile of claim 1 further comprising a catalytic converter coupled to the engine and for generating heat, wherein the energy generation unit includes:
regenerative braking unit configured to generate energy for charging the capacitor when the automobile breaks,
a heat exchange unit configured to receive an output of the catalytic converter and generate energy for charging the capacitor using the heat generated by the catalytic converter, and
a ram induction generator configured to receive a flow of air when the automobile moves and generate energy for charging the capacitor.

4. The automobile of claim 1 wherein the engine is an internal combustion engine, and the electric motor is configured to operate while the engine is operating.

5. The automobile of claim 1 further comprising a catalytic converter coupled to the engine and for generating heat, wherein the energy generation unit includes a heat exchange unit including a core unit configured to receive an output of the catalytic converter and an energy generation module configured to generate energy for charging the capacitor using the heat generated by the catalytic converter.

6. The automobile of claim 1 further comprising a catalytic converter coupled to the engine and for generating heat,
wherein the energy generation unit includes a heat exchange unit located adjacent to the catalytic converter, the heat exchange unit including a core unit configured to receive an output of the catalytic converter and an energy generation module configured to generate energy for charging the capacitor using the heat generated by the catalytic converter.

7. An automobile comprising:
a plurality of wheels having a first set and a second set;
an electric motor configured to apply a mechanical force or torque to the second set of the plurality of wheels to drive the second set of plurality of the wheels;
an engine configured to operate while the electric motor is operating and apply a mechanical force or torque to a first set of the plurality of wheels to drive the first set of plurality of wheels based on a total amount of the mechanical force or torque applied by the electric motor;
an engine control unit coupled to the engine and the electric motor and configured to:
increase a total amount of the mechanical force or torque applied by the engine when the total amount of the mechanical force or torque applied by the electric motor decreases such that the total amount of the mechanical force or torque applied by the electric motor is insufficient without the increased total amount of the mechanical force or torque applied by the engine to maintain an acceleration profile of the automobile, and
decrease the total amount of the mechanical force or torque applied by the engine when the total amount of the mechanical force or torque applied by the electric motor increases to maintain the acceleration profile of the automobile;
a capacitor configured to power the electric motor; and
an energy generation unit configured to charge the capacitor.

8. The automobile of claim 7 wherein the energy generation unit includes a heat exchange unit, a ram induction generator, and a regenerative braking unit.

9. The automobile of claim 8 further comprising a catalytic converter coupled to the engine and for generating heat, and the energy generation unit includes the heat exchange unit, wherein the heat exchange unit generates energy using the heat generated by the catalytic converter.

10. The automobile of claim 7 wherein the first set of the plurality of wheels includes at least one wheel which is not included in the second set of the plurality of wheels.

11. The automobile of claim 7 wherein the first set of the plurality of wheels is identical to the second set of the plurality of wheels.

12. A method for driving a plurality of wheels of an automobile having an engine, an electric motor and an engine control unit connected to the engine and the electric motor, the plurality of wheels having a first set and a second set, the method comprising:
   applying, using the electric motor, a mechanical force or torque to the second set of the plurality of wheels to drive the second set of plurality of the wheels;
   determining, using the engine control unit, a total deficiency amount of mechanical force or torque corresponding to a total amount of mechanical force or torque needed to supplement a total amount of mechanical force or torque applied by the electric motor in order to maintain an acceleration profile of the automobile that is based on a driver's acceleration demand;
   applying, using the engine, a mechanical force or torque to the first set of the plurality of wheels, wherein a total amount of the mechanical force or torque applied by the engine is based on the total deficiency amount of mechanical force or torque;
   increasing, using the engine control unit, the total amount of the mechanical force or torque applied by the engine when the total deficiency amount of mechanical force or torque increases to maintain the acceleration profile of the automobile;
   decreasing, using the engine control unit, the total amount of the mechanical force or torque applied by the engine when the total deficiency amount of mechanical force or torque decreases to maintain the acceleration profile of the automobile;
   generating, using an energy generation unit, energy for charging a capacitor; and
   powering the electric motor using the capacitor.

13. The method of claim 12 wherein the capacitor is charged using a solar panel, a ram induction generator, and a regenerative braking unit.

14. The method of claim 12 wherein the capacitor, using a heat exchange unit, from heat generated by a catalytic converter.

15. The method of claim 12 further comprising:
   measuring a charge of the capacitor; and
   controlling an operation of the engine based on the measured charge of the capacitor.

16. The method of claim 12 further comprising operating the electric motor while the engine is operating.

17. The automobile of claim 7 wherein the engine control unit is configured to:
   increase the total amount of the mechanical force or torque applied by the engine when the total amount of the mechanical force or torque applied by the electric motor decreases, regardless of a rate of change of the total amount of the mechanical force or torque applied by the electric motor, and
   decrease the total amount of the mechanical force or torque applied by the engine when the total amount of the mechanical force or torque applied by the electric motor increases, regardless of the rate of change of the total amount of the mechanical force or torque applied by the electric motor.

* * * * *